Aug. 5, 1969     F. BONNERIC     3,459,057
DEVICE FOR CONTROLLING THE DISPLACEMENT OF A
MOVING ELEMENT

Filed March 14, 1967     2 Sheets-Sheet 1

INVENTOR
Francis Bonneric
By Sparrow and Sparrow
ATTORNEYS

3,459,057
**DEVICE FOR CONTROLLING THE DISPLACE-
MENT OF A MOVING ELEMENT**
Francis Bonneric, Fleury-les-Aubrais, France, as-
signor to Service d'Exploitation Industrielle des
Tabacs et des Allumettes, Paris, France, a French
public establishment
Filed Mar. 14, 1967, Ser. No. 623,069
Claims priority, application France, Mar. 15, 1966,
53,395
Int. Cl. F16h 27/02, 29/02, 29/20
U.S. Cl. 74—89.15       4 Claims

ABSTRACT OF THE DISCLOSURE

Device for controlling the displacement of a moving element of the type comprising a shaft which is movable in translation and provided with a threaded portion and a splined portion and two plates mounted in fixed parallel planes in such a manner as to be capable of rotating about the axis of said shaft, the hub of one of said plates being adapted to engage said splined portion and the hub of the other plate being adapted to engage said threaded portion, and two independent means being provided for driving said plates in rotation.

---

Figure 1:
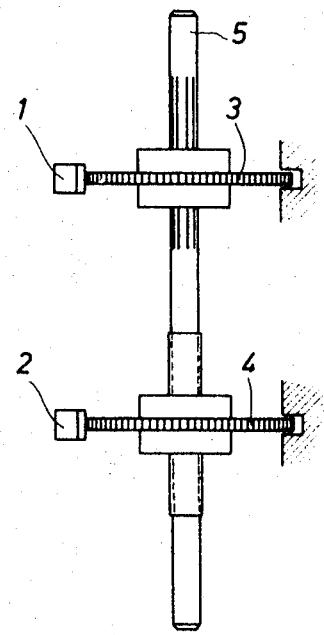

This invention relates to a device for controlling the displacement of a moving element of the type comprising a shaft which is movable in translation and provided with a threaded portion and a splined portion and two plates mounted in fixed parallel planes in such a manner as to be capable of rotating about the axis of said shaft, the hub of one of said plates being adapted to engage said splined portion and the hub of the other plate being adapted to engage said threaded portion.

The device in accordance with the invention comprises two independent means for driving said plates in rotation and is preferably provided with a free-wheel system between at least one of said plates and the hub of said plate.

The driving means can comprise a rack which is adapted to engage with teeth formed at the periphery of each plate. In this case, it is possible to provide on the path of said racks positionally adjustable stops for the purpose of limiting the travel of said rack with a high degree of precision. Provision can also be made for positionally adjustable detectors which initiate the stoppage of the rack.

The device according to the invention can be employed primarily for the purpose of varying the distance between two elements, one element being stationary whilst the other element is coupled to the shaft.

It accordingly follows that the device in accordance with the invention can be applied to the control of the volumetric pre-dosing system of an automatic machine for weighing cut tobacco as described in the co-pending U.S. patent application No. 420,938, filed on Dec. 24, 1964, now abandoned.

The device in accordance with the invention can also serve as comparator for the displacements of two moving systems.

The displacement of each moving system produces the movement of rotation of one of the plates by means of a suitable drive system.

In order to compare or to regulate the speeds of rotation of two systems, the movements of such systems are transmitted by means of suitable motion-reduction mechanisms to gear-wheels which are coupled to the aforesaid plates.

In order to regulate the speeds of rotation, steps can be taken to ensure that the displacement of the shaft actuates a regulating device in the appropriate direction; for example, the shaft is coupled to an armature which produces a variation in the inductance of the electric control circuit of one of the systems.

In order to compare the movements of translation of two moving systems, the shaft is placed at right angles to two paths and the moving systems drive the plates by tangential action; the displacement of the shaft is proportion to the difference in relative amplitude of the two translational movements.

In order to take into account the movements of a moving system only in a predetermined direction, a free wheel is interposed between the periphery of the plate and the hub which is coupled to the shaft; the free wheel has an internal working torque which is higher than the screw-and-nut adhesion couple.

In order to limit the travel of the shaft prior to un-coupling or jamming of the sliding assemblies or screw-and-nut assemblies, provision is made for end-of-travel stops; these stops also indicate that a threshold of difference of the movements of the two moving systems has been overstepped and initiate, for example, the stopping of said systems.

Figure 2:
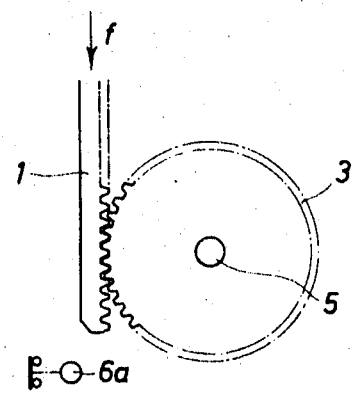
Figure 3:
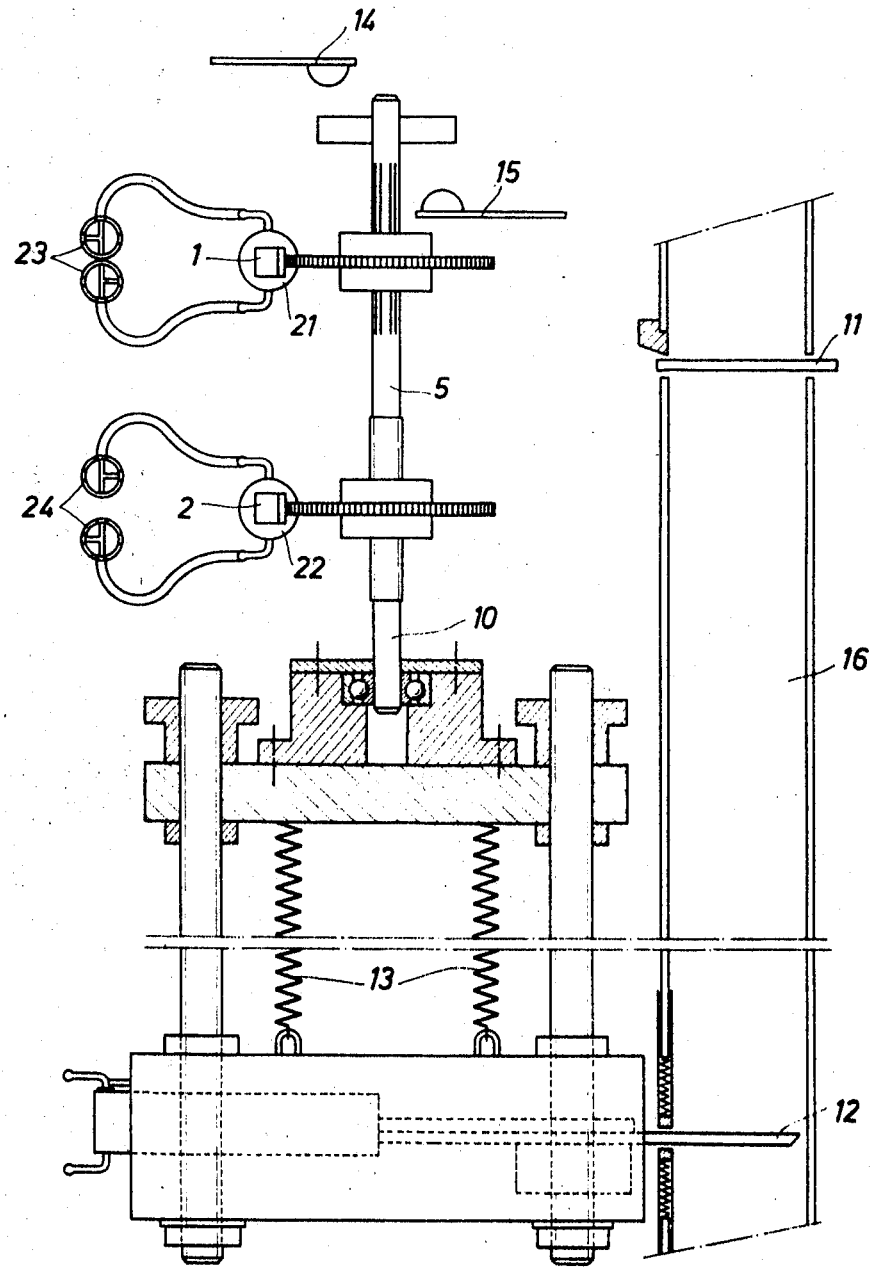

One example of construction of the device according to the invention and one of its applications will now be described below without implied limitation, reference being made to the accompanying drawings, in which:

FIG. 1 is a view in elevation of the device proper;
FIG. 2 is an overhead view of the device of FIG. 1; and
FIG. 3 is a diagrammatic sectional view of the device which is utilized for the volumetric regulation of pre-doses of an automatic machine for weighing cut tobacco.

As shown in the drawings, the racks 1 and 2 are each adopted to engage with a pinion 3 or 4 which is rotatbale in a particular horizontal plane about a common axis; this vertical axis is also the axis of a moving shaft 5 which is splined at the top portion thereof and threaded at the bottom portion thereof. The hub of the pinion 3 is internally grooved so as to be rigidly coupled for rotation with the shaft 5 whilst the hub of the pinion 4 forms a nut around the threaded portion of said shaft.

The hubs referred-to above are coupled to the crowns of the pinions 3 and 4 by means of a free wheel so that said hubs are driven by said pinions only in the direction according to FIG. 2 while exhibiting a certain resistance in the other direction which is greater than the friction couple between the threaded portion and the nut. A friction washer (not shown in the drawings) which is fitted on the shaft 5 eliminates the risk of driving the pinion 3 in the reverse direction by the rack 1; similarly, a friction washer mounted on the nut-hub of the pinion 4 prevents the reverse motion of said pinion.

Since the rack 1 is actuated in the direction of the arrow $f$ of FIG. 2, the pinion 3 and the shaft 5 rotate in the according to the lead of the screw direction. The nut-hub of the pinion 4 being maintained stationary, the threaded portion unscrews and the shaft moves upwards. A return movement of the rack 1 will have no effect inasmuch as the shaft is braked and the free wheel of the pinion 3 releases the drive; on the contrary, if the rack 2 is actuated in the direction of the arrow $f$, the nut-hub of the pinion 4 will have a tendency as it rotates to move upwards over the threaded portion of the shaft 5 which is secured against rotation. Inasmuch as the level of the pinion 4 is constant, the shaft 5 will accordingly move downwards. The return motion of the rack 2 will also have no effect.

If the two racks advance over the same distance, the screw and nut rotate through a same angle and the level of the shaft remains unchanged.

The downward or upward movements of the shaft are proportional to the relative displacements of the racks. It is apparent that there has thus been devised a system for the comparison of the movements of the racks and therefore of the components to which said racks are coupled.

It is understood that, if the racks are replaced by gearwheels which are driven by the shafts of two rotating machines, the speeds of these machines can be compared. Thus, two machines which are intended to rotate at proportional speeds can be synchronized by utilizing the vertical displacement of the shaft for the purpose of modifying the regulation of the motor of the controlled machine. In particular, the speeds of rotation of two shafts can readily be made equal by means of a symmetrical assembly.

In the embodiments of the invention which have been described in the foregoing, the free-wheel mechanisms can be retained as a safety measure in order to ensure that, in the absence of sufficient corrective action or as a result of successive additions of deviations in the same direction, the shaft is not driven directly in rotation by the two pinions when the end of a threaded portion or splined portion is reached. However, it is desirable to ensure that end-of-travel contacts should deliver signal before the occurrence either of jamming or uncoupling of the shaft and thus permit the necessary remedial action.

The regulating mechanism which is shown in FIG. 3 makes use of a system comprising racks, pinions, and screw-and-nut unit of similar type to the system of FIG. 1 but employed for the volumetric regulation of pre-doses in an automatic machine for weighing and dosing cut tobacco.

In a machine as described in the cited application, it is of particular interest to constitute pre-doses from a volume comprised between a top limit and a bottom limit and to complete each pre-dose with a make-up dose such that the total weight of doses thus made up is very close to that which is indicated. It is by adopting this mode of procedure that maximum integrity of the product is preserved. The minimum and maximum volumes are established with due allowance for variations in bulk density of the cut tobacco, thereby ensuring that the necessary make-up dose can always be added in the following time interval which is strictly limited if the weighing and dosing machine is coupled to packing machine which operates at a predetermined production speed. For different reasons both technical and theoretical, the make-up dose is supplied by a distributor at a rate of delivery which is relatively low and constant. If the time taken to constitute the make-up dose tends to be short of the maximum available time by too small an amount, it proves necessary to increase the volume of the pre-doses in the following weighings; should such a precaution not be taken, the occurrence of any fault condition would entail the risk of failure to meet the production requirements of the packing machine. If, on the contrary, the actual time taken to constitute the make-up dose proves to be considerably less than the time available for the operation, it is an advantage in such a case to reduce the volume of pre-doses in order to forestall any danger of exceeding the established total dose weight as a consequence of successive digressions in the supply of pre-doses alone.

The foregoing clearly illustrates the advantage of regulating the volume of pre-doses as a function of the time taken to constitute preceding make-up doses.

In the device of FIG. 3, the level of one of the "blades" is determined by the level of the extremity 10 of the rod or shaft 5. It should be pointed out that the volume of a pre-dose which is formed in a vertical passageway 16 is a function of the distance between a top blade 11 which cuts the tobacco and a bottom blade or shutter 12, the pre-dose thus formed between the two blades being retained by said shutter for the period of time corresponding to the duration of the supply, then released.

Inasmuch as the top blade 11 is stationary, any downward or upward displacement of the blade 12 will have the effect of producing a variation in the volume of the pre-dose in the desired direction. In order that the force which is necessary for this displacement should not exceed the maximum stress which can be transmitted by the racks-pinions-screw-nut mechanism as governed by the internal frictional contacts of the free wheels which are incorporated in the pinions 3 and 4, provision has accordingly been made for balanced compensation springs 13 for the purpose of reducing to the maximum extent the adhesion between the nut-hub of the pinion 3 and the threaded portion of the rod 5. There is thus prevented any internal "slippage" within the drive system, at least as long as the safety limits indicated by the references 14 and 15 have not been overstepped. These limits correspond on the one hand to the maximum and minimum permissible volumes of pre-doses and are set at a very small distance short of the end of travel of the pinions 3 and 4 either on the splined portion or on the threaded portion of the shaft 5.

The racks 1 and 2 are coupled to driving units, the displacement of which represents the corrections which have to be made to the volume of pre-doses to be constituted, taking into account the time of constitution of the preceding make-up doses, the corrections referred-to being determined, for example, from the difference between the time of operation of the make-up dose distributor and the optimum time $T_0$ as established by experiment. Said driving units could be two small pneumatic jacks 21 and 22 controlled by electrovalves 23 and 24 which are connected to a low-pressure compressed-air supply and connected electrically to the machine regulating system. The electrovalve 23 and the contact 6b of FIG. 2 will be rendered operative prior to the following pre-dose whenever the make-up dose time is distinctly insufficient as a result of excessive duration of the preceding pre-dose. The jack 21 which is supplied will then displace the rack 1 until this latter comes into contact with the contact 6b, thereby de-energizing the electrovalve 23, connecting the jack 21 to the atmosphere and interrupting of the supply of compressed air to this latter, thereby causing the immediate stoppage of the rack 1. By means of the pinion 3 and the rod 5, the blade 12 will have been moved upward to the requisite extent and the volume of the following pre-dose will similarly have been reduced accordingly. Also, in the case of excessive length of the make-up dose time, the contact associated with rack 2 and similar to contact 6a can be actuated and the rack 2 can be displaced by means of the jack 22 (by energizing the electrovalve 24) at the requisite moment and over a sufficient distance to lower the rod 5 and the blade 12 to the extent which is necessary to correct the excess time by producing an increase in volume.

In the example which has just been given, it has been assumed that each substantial variation which is detected in a make-up dose time would result in a correction of the following pre-dose in the required direction. It is apparent that it is not always either possible or even desirable to perform such a simple type of adjustment. In particular, when the weighing and dosing machine comprises two passageways for constituting pre-doses and supplied by a single make-up dose distributor, it is necessary to direct the corrective action to the bottom blades of either one passageway or the other, depending on the recorded constitution-time either in one case or in the other. The general programmer which coordinates the operation of the weighing and dosing machine proper as a function of the production speed imposed by the packing machine could be assigned to this duty.

Broadly speaking, a correction order can be delayed as long as a number of readings of the difference between the make-up dose constitution-time and the optimum time $T_0$ have not resulted in concordant indications in a same passageway. It is possible, for example, to cumulate such differences algebraically and to save a "quantum" of correction in the required direction only when the total has reached a predetermined value, whether positive or negative. This correction could even be more or less substantial, for example, by employing the micro-contacts $6a$, $6b$, $6c$ or similar contacts associated with rack 2, according as this threshold has been overstepped more or less rapidly. A counter which is reset to zero after each correction can, for example, actuate the contact $6c$ after $n$ readings, the contact $6b$ after $m$ readings and the contact $6a$ after $p$ readings with $n<m<p$. The value of the correction is thus proportioned to the mean value of the variations, with the result that the data received can be followed with greater discrimination while taking into account only their "smoothed" mean value.

What I claim is:

1. In a device for controlling the displacement of a moving element of the type comprising a shaft which is axially movable and provided with a threaded portion and with a splined portion, two plates mounted in fixed parallel planes in such manner as to be capable of rotating about the axis of said shaft, hubs on said plates, the hub of one of said plates adapted to engage said splined portion, the hub of the other plate adapted to engage said threaded portion, two independent means for rotatably driving said plates and a freewheel system between at least one of said plates and said hub of said plate.

2. In a device for controlling the displacement of a moving element of the type comprising a shaft which is axially movabe and provided with a threaded portion and with a splined portion, two plates mounted in fixed parallel planes in such manner as to be capable of rotating about the axis of said shaft, hubs on said plates, the hub of one of said plates adapted to engage said splined portion, the hub of the other plate adapted to engage said threaded portion and two independent means for rotatably driving said plates, said means for driving at least one of said plates comprising a rack engageable with teeth formed on the periphery of said plate.

3. In a device according to claim 2, and means on the path of said rack for at least one positionally adjustable stop for limiting the travel of said rack.

4. In a device according to claim 2, and means on the path of said rack for at least one positionally adjustable detector for controlling the stoppage of said rack.

References Cited

UNITED STATES PATENTS

| | | |
|---|---|---|
| 1,413,982 | 4/1922 | Gill. |
| 2,520,014 | 8/1950 | Rehnberg et al. |
| 2,630,022 | 3/1953 | Terdina. |
| 2,860,266 | 11/1958 | Schrader. |

LEONARD H. GERIN, Primary Examiner

U.S. Cl. X.R.

74—388, 424